United States Patent Office 3,531,396
Patented Sept. 29, 1970

3,531,396
HYDROCRACKING IN THE PRESENCE OF HYDROGEN CONTAINING A MINOR AMOUNT OF CARBON MONOXIDE
Donald A. Messing, Wappingers Falls, and Edward T. Child, Fishkill, N.Y., assignors to Texaco Inc., New York, N.Y., a corporation of Delaware
No Drawing. Filed June 25, 1968, Ser. No. 739,647
Int. Cl. C10g 13/02
U.S. Cl. 208—111                                7 Claims

ABSTRACT OF THE DISCLOSURE

Hydrocarbon oils are hydrocracked in the presence of hydrogen containing a minor amount of carbon monoxide without significant catalyst poisoning by conducting the hydrocracking in the presence of a catalyst comprising sulfided nickel and tungsten supported on a base comprising a zeolite of low alkali metal content.

---

Hydrocracking of petroleum oils has been known for many years and was practiced although not too successfully several decades ago. However, with the development of new catalysts and new operating techniques, it has been improved to the extent that it is now a well established process in the petroleum refining industry. In the hydrocracking of hydrocarbon oils the charge stock is brought into contact with a hydrocracking catalyst at elevated temperatures and pressures in the presence of hydrogen and is thus converted into lighter products.

Conventional hydrocracking catalysts comprise at least two components, a hydrogenating component and a cracking component, the hydrogenating component ordinarily being supported on the cracking component. The hydrogenating component frequently is a Group VIII metal or compound thereof, for example, a noble metal such as platinum or palladium or an iron group metal such as nickel or cobalt. The iron group metal may be used in conjunction with a Group VI metal such as molybdenum or tungsten. When the hydrogenating component comprises a nobel metal, it is generally present in an amount between about 0.1 and 5% by weight of the catalyst composite and preferably between 0.5 and 2%. When the hydrogenating component comprises a Group VIII metal it is generally present in an amount between 5 and 40%, preferably between 8 and 30%. Particularly suitable catalysts are those containing between 0.6 and 0.9 weight percent palladium or 6% nickel and 20% tungsten.

The cracking component of the hydrocracking catalyst may comprise catalysts which ordinarily are used in catalytic cracking units. Such catalysts generally are composed of a mixture of refractory amorphous inorganic oxides such as magnesia, silica, alumina and the like. A mixture containing between 70 and 80% silica and 20 and 30% alumina has attained considerable commercial acceptance. More recently, crystalline zeolites such as zeolite Y have been found to be suitable supports for the hydrogenating component, especially when they have been subjected to an ion exchange treatment to reduce the alkali metal content of the zeolite. As a result of these advances in the catalyst art, perhaps one of the most popular hydrocracking catalysts in commercial use today comprises a nobel metal, because of its excellent hydrogenating activity, supported on a low alkali metal zeolite because of its good cracking activity and also because of its resistance to poisoning by ammonia.

In the early days of commercial hydrocracking, the capacity of the hydrocracking units was so small that the hydrogen demands of the hydrocracker could be met satisfactorily by the amount of by-product hydrogen produced in the catalytic reforming units present in most refineries. Now, however, because of the increased capacity of hydrocracking in most refineries without a corresponding increase in the catalytic reforming capacity, there has been a shortage of hydrogen and it has become necessary to augment the available hydrogen supply by the installation of hydrogen generating units. This increased hydrogen production has been provided by the gasification of hydrocarbons to a synthesis gas composed for the most part of carbon monoxide and hydrogen either by the partial oxidation of hydrocarbons or by the reforming of hydrocarbons with steam. Conventionally the synthesis gas is passed in the presence of steam into contact with a shift conversion catalyst such as iron oxide which results in the production of a gas composed for the most part of hydrogen and carbon dioxide. The carbon dioxide content is reduced to a negligible level by scrubbing for example with aqueous monoethanolamine to yield a gas containing about 96–98% hydrogen and about 2% CO with smaller amounts of other impurities. It has been found necessary when the hydrocracking catalyst is composed of a noble metal supported on low sodium zeolite Y, to subject the scrubbed shifted gas to a treatment such as scrubbing with a cuprous ammonium acetate or cuprous ammonium formate solution or by low temperature fractionation followed by liquid nitrogen wash to remove residual CO to a level below about 50 p.p.m., preferably below 10 p.p.m. because of the poisoning effect of the CO on the hydrocracking catalyst. This treatment for the removal of residual CO adds to the cost of the production of the hydrogen and therefore is economically disadvantageous. In addition, it sometimes happens that the hydrogen purification system becomes upset which results in the introduction into the hydrocracking zone of hydrogen containing an undesirably high content of CO. If the upset is not detected promptly and either corrected or the unit shut down, the situation becomes extremely serious as prolonged operation with hydrogen containing excessive amounts of CO can result in the complete poisoning of the catalyst.

It is therefore an object of the present invention to carry out a hydrocracking process in the presence of a catalyst which is not poisoned by the use of hydrogen containing minor amounts of CO. Another object is to provide a hydrocracking process which can continue to operate when the hydrogen purification system is upset. Still another object of the invention is to provide a combination synthesis gas generation-hydrocracking process in which the CO removal step is omitted. Another object is to produce a high quality naphtha by a hydrocracking process which is conducted in the presence of CO. These and other objects will be obvious to those skilled in the art from the following disclosure.

According to our invention there is provided a process for the hydrocracking of a hydrocarbon oil which comprises contacting the hydrocarbon oil in the presence of hydrogen using a hydrocracking catalyst comprising an iron group metal under hydrocracking conditions, said hydrogen containing at least 50 p.p.m. CO.

Hydrocarbons which may be treated by our process include straight run gas oil, fluid catalytically cracked cycle gas oil, delayed coker gas oil, shale oil, tar sand oil, atmospheric residuum and the like. The charge stock may or may not be subjected to a preliminary hydrotreating to convert sulfur therein to $H_2S$ and nitrogen to $NH_3$. When the charge is so treated, the effluent from the hydrotreating zone depending on the hydrocracking catalyst may be subjected to treatment for the removal of $NH_3$ or may be sent directly to the hydrocracking zone without intermediate treatment. If the catalyst is resistant to nitrogen then the preliminary treating may be dispensed

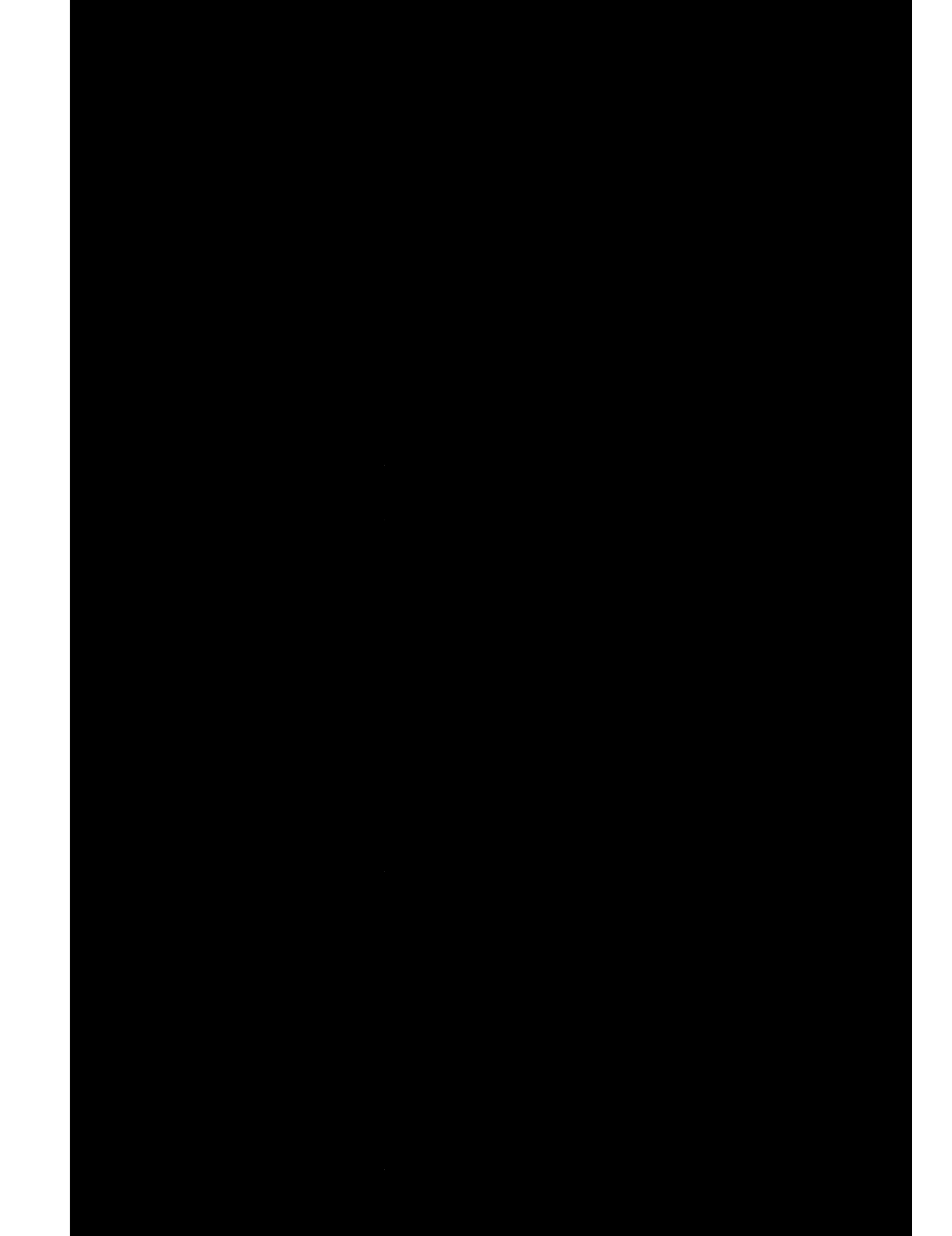

either be the salt of a single rare earth metal or, as is usually the case, mixtures of rare earth metals such as rare earth metal chlorides of didymium chlorides. It is contemplated that the product thus treated comprises rare earth cations chemisorbed or ionically bonded to the faujasite, although it may very well be that at least a portion of said cations may be sorbed or bonded to the amorphous silica component of the catalyst composite. Anions introduced to the composite as a consequence of the base-exchange treatment are suitably separated by water-washing one or more times until free of said ions. The composite is thereafter dried, generally in an air atmosphere, an elevated temperature of from about 150° F. to about 600° F. being suitable. The catalysts thus prepared are particularly effective in the cracking of hydrocarbon feed stocks, such as occur in the gas-oil range of petroleum hydrocarbons, to form lower boiling hydrocarbons in the motor fuel range at catalytic cracking conditions generally described in the art. In particular, a temperature of from about 700° F. to about 1200° F. may be employed and the pressure may range from subatmospheric to several atmospheres. The cracking process can be effected by any of the well-known techniques including a fixed bed type of operation, a moving bed type of operation, and, in particular, the well-known fluidized bed type of operation.

Also of interest are those catalysts comprising one or more metals of Group VI-B and VIII including molybdenum, tungsten, chromium, iron, nickel, cobalt, platinum, palladium, ruthenium, rhodium, osmium and iridium. Thus, the catalyst composite prepared in accordance with the process of this invention can be utilized advantageously as a catalyst, or as a component thereof, to effect a variety of hydrocarbon conversion reactions involving reaction conditions comprising a temperature in the 70–1400° F. range. The catalyst composite of this invention is particularly useful in combination with a hydrogenation component such as nickel together with molybdenum, tungsten, etc., in effecting the hydrocracking of heavy oils, including vacuum residuals, in the presence of hydrogen to form petroleum products in the middle distillate range utilizing a temperature of from about 500° F. to about 1000° F. and pressures of from about 500 p.s.i.g. to about 2500 p.s.i.g. Said hydrocarbon conversion reactions further include polymerization of olefins, particularly ethylene, propylene, 1-butene, 2-butene, iso-butylene, and also higher boiling olefins, at polymerization reaction conditions. The catalyst composite is also useful as a catalyst or a component thereof in effecting the alkylation of isoparaffins with olefins or other alkylating agents including for example, alkyl halides and the like; and also for the alkylation of isobutane, isopentane and/or isohexane with ethylene, propylene, 1-butene, etc., or mixtures thereof; and also the alkylation of aromatics with olefins or other alkylating agents, particularly the alkylation of benzene, toluene, etc., with propylene, and higher boiling olefins including nonenes, decenes, undecenes, etc., the foregoing alkylation reactions being effected at alkylation conditions disclosed in the art. The catalyst products of the method of this invention are further helpful in the isomerization of paraffins, particularly n-butane, n-pentane, n-hexane, n-heptane, n-octane, etc., and also the isomerization of less highly branched chain saturated hydrocarbons such as the isomerization of 2- or 3-methylpentane to 2,3- and 2,2-dimethylbutane, isomerization of dimethylcyclohexane to methylcyclohexane, isomerization of methylcyclopentane to cyclohexane, etc., at isomerization reaction conditions. Other hydrocarbon conversion reactions including hydrogen transfer reactions, transalkylation reactions, and the reforming of gasoline or naphtha to improve the anti-knock characteristics thereof, are effectively catalyzed utilizing the catalyst composite prepared in accordance with the method of this invention as a catalyst or component thereof.

The following examples are presented in illustration of the method of this invention and are not intended as a limitation on the generally broad scope of the invention as set out in the appended claims.

EXAMPLE I

In the preparation of a faujasite dispersed in its mother liquor, 348.6 grams of sodium aluminate (Nalco #680) was dissolved in a solution of 332 grams of sodium hydroxide in 1340 cubic centimeters of water. The resulting solution was added to a rapidly stirred slurry consisting of 958 grams of silica (Hi-Sil #233) and 2800 cubic centimeters of water. The reaction mixture expressed in terms of oxide mole ratios had a composition as follows:

$Na_2O/SiO_2$ ---------------------------------- 0.4
$SiO_2/Al_2O_3$ ---------------------------------- 10
$H_2O/Na_2O$ ---------------------------------- 40

This reaction mixture was stirred at about room temperature for 6 hours and then further aged without stirring for 16 hours. The reaction mixture was thereafter heated to 198° F. over a period of 8 hours and then heated at 198.212° F. for about 24 hours and then cooled to room temperature. The reaction mixture analyzed 12.6 weight percent faujasite.

An acidic sodium silicate solution was prepared by the addition of about 22 liters of a water glass solution (6.9% $SiO_2$) to about 3.0 liters of 25% sulfuric acid, the pH attaining 3.5. The resulting solution was stirred vigorously and 1570 grams of the faujasite-mother liquor added thereto together with about 470 ml. of 25% sulfuric acid to attain a pH of 4.0–4.2. The pH was adjusted if necessary to 4.2 by the further addition of water glass solution. Within about 15 minutes the mixture started to gel and stirring was continued for an additional 15 minutes. Thereafter, the pH of the mixture was adjusted to 5.5 by the further addition of water glass and aged for about 1 hour. The total amount of said water glass solution employed was 22.18 liters. The aged product was then filtered and reslurried in water. The slurry was adjusted to a pH of 3.9 by the addition of 40 cubic centimeters of glacial acetic acid, aged for a period of 6 hours and spray-dried. The spray-dried product was further treated as hereinafter described to form a catalyst designated as "Catalyst A."

EXAMPLE II

A second catalyst designated as "Catalyst B" was prepared in substantially the same manner as hereinabove described with the exception that said aged product, filtered and reslurried in water, was adjusted to a pH of 3.7 by the addition of 80 cubic centimeters of glacial acetic acid, aged for a period of 6 hours and spray-dried. The spray-dried product was further treated as hereinafter described to yield the product designated as "Catalyst B."

EXAMPLE III

A third catalyst designated as "Catalyst C" was prepared substantially as described with the exception that said aged product, filtered and reslurried in water, was adjusted to a pH of 3.6 by the addition of 120 cubic centimeters of glacial acetic acid, aged for a 6 hour period and spray-dried. The spray-dried product was further treated as hereinafter described to yield the product designated as "Catalyst C."

EXAMPLE IV

Still another catalyst, designated as "Catalyst D," was prepared substantially as described with the exception that said aged product, filtered and reslurried in water, was adjusted to a pH of 3.4 by the addition of 12 cubic centimeters of concentrated 96% sulfuric acid diluted to 100 cubic centimeters with water. The product was aged for a period of 6 hours and thereafter spray-dried. The spray-dried product was then further treated as minosilicate reaction mixture having a composition expressed in terms of oxide mole ratios in the following range:

| | |
|---|---|
| $Na_2O/SiO_2$ | 0.3–0.7 |
| $SiO_2/Al_2O_3$ | 6–20 |
| $H_2O/Na_2O$ | 25–60 |

3. The method of claim 2 further characterized with respect to step (a) in that said crystalline sodium aluminosilicate-mother liquor mixture is admixed with said silica sol by dispersing said mixture in an acidified alkali metal silicate solution having a pH in excess of about 2.5, the pH of the reaction mixture being controlled while effecting said dispersion so as not to exceed about 4.5, the final pH being from about 3.5 to about 4.5.

4. The method of claim 3 further characterized with respect to step (e) in that said catalyst composite is dried by spray-drying means whereby a rapid evaporation of moisture is effected and dried particles fall out of the spray.

5. The method of claim 4 further characterized with respect to step (e) in that said catalyst composite is spray-dried at an inlet temperature of from about 650° F. to about 1200° F.

6. The method of claim 5 further characterized with respect to step (e) in that the dried catalyst composite is further treated in contact with a solution comprising ammonium ions whereby the total alkali metal content is reduced to less than about 1 weight percent thereof.

7. The method of claim 6 further characterized with respect to step (e) in that the substantially alkali metal catalyst composite is base-exchanged in contact with a solution comprising rare earth metal cations whereby the final catalyst composite comprises aluminum and rare earth metals in a ratio of from about 3:1 to about 6:1.

8. The method of claim 7 further characterized in that said ion-exchange solution comprises a weak acid.

9. The method of claim 8 further characterized in that said weak acid is acetic acid.

10. The method of claim 7 further characterized in that the product of step (a) is treated, prior to treatment in accordance with step (b), in contact with an ion-exchange solution comprising hydrogen ions for a period of at least about 0.5 hour while maintaining the reaction mixture at a pH of from about 3.5 to about 4.0.

11. The method of claim 7 further characterized in that the product of step (b) is treated, prior to treatment in accordance with step (c), in contact with an ion exchange solution comprising hydrogen ions for a period of at least about 0.5 hour while maintaining the reaction mixture at a pH of from about 3.5 to about 4.0.

12. The method of claim 7 further characterized in that the product of step (c) is treated, prior to treatment in accordance with step (d), in contact with an ion exchange solution comprising hydrogen ions for a period of at least about 0.5 hour while maintaining the reaction mixture at a pH of from about 3.5 to about 4.0.

13. The method of claim 7 further characterized in that the product of step (d) is treated, prior to treatment in accordance with step (e), in contact with an ion-exchange solution comprising hydrogen ions for a period of at least about 0.5 hour while maintaining the reaction mixture at a pH of from about 3.5 to about 4.0.

14. A process for cracking a hydrocarbon charge stock which comprises contacting said charge stock with the catalyst composite prepared in accordance with the process of claim 10 at cracking conditions.

15. A process for cracking a hydrocarbon charge stock which comprises contacting said charge stock with the catalyst composite prepared in accordance with the process of claim 13 at cracking conditions.

16. A crystalline aluminosilicate-silica matrix product produced by the method of claim 4.

17. A crystalline aluminosilicate-silica matrix product produced by the method of claim 7.

References Cited

UNITED STATES PATENTS

| | | | |
|---|---|---|---|
| 3,140,253 | 7/1964 | Plank et al. | 208—120 |
| 3,329,628 | 7/1967 | Gladrow et al. | 252—455 X |
| 3,344,086 | 9/1967 | Cramer et al. | 252—451 X |
| 3,352,796 | 11/1967 | Kimberlin et al. | 252—455 |
| 3,425,956 | 2/1969 | Baker et al. | 252—455 |
| 3,410,808 | 11/1968 | Smith et al. | 252—453 |

DANIEL E. WYMAN, Primary Examiner

C. F. DEES, Assistant Examiner

U.S. Cl. X.R.

252—451, 455